United States Patent
Candelore

(10) Patent No.: US 9,998,799 B2
(45) Date of Patent: Jun. 12, 2018

(54) SCENE-BY-SCENE PLOT CONTEXT FOR COGNITIVELY IMPAIRED

(71) Applicant: Sony Corporation, Tokyo (JP)

(72) Inventor: Brant Candelore, San Diego, CA (US)

(73) Assignee: Sony Corporation, Tokyo (JP)

(*) Notice: Subject to any disclaimer, the term of this patent is extended or adjusted under 35 U.S.C. 154(b) by 53 days.

(21) Appl. No.: 14/461,385

(22) Filed: Aug. 16, 2014

(65) Prior Publication Data

US 2016/0050467 A1 Feb. 18, 2016

(51) Int. Cl.
| | |
|---|---|
| *H04N 7/10* | (2006.01) |
| *H04N 7/025* | (2006.01) |
| *H04N 21/81* | (2011.01) |
| *H04N 21/4722* | (2011.01) |
| *H04N 21/488* | (2011.01) |
| *H04N 21/84* | (2011.01) |
| *H04N 21/845* | (2011.01) |

(52) U.S. Cl.
CPC ..... *H04N 21/8133* (2013.01); *H04N 21/4722* (2013.01); *H04N 21/4882* (2013.01); *H04N 21/4888* (2013.01); *H04N 21/84* (2013.01); *H04N 21/8456* (2013.01)

(58) Field of Classification Search
USPC ........................................................ 348/734
See application file for complete search history.

(56) References Cited

U.S. PATENT DOCUMENTS

| | | | |
|---|---|---|---|
| 6,219,837 B1* | 4/2001 | Yeo ................... | G06F 17/30843 348/564 |
| 7,020,889 B1* | 3/2006 | Hutter ................... | H04H 20/28 348/564 |
| 8,321,203 B2 | 11/2012 | Seo | |
| 9,438,947 B2 | 9/2016 | Schneiderman et al. | |
| 9,578,392 B2 | 2/2017 | Abecassis et al. | |
| 2003/0115607 A1* | 6/2003 | Morioka .............. | H04N 5/4448 725/61 |
| 2005/0097621 A1 | 5/2005 | Wallace et al. | |
| 2005/0228806 A1* | 10/2005 | Haberman ........ | G06F 17/30265 |
| 2005/0278734 A1 | 12/2005 | Franklin et al. | |
| 2005/0283804 A1* | 12/2005 | Sakata .............. | H04N 5/44543 725/52 |

(Continued)

FOREIGN PATENT DOCUMENTS

| | | |
|---|---|---|
| JP | 2001044948 A | 2/2001 |
| JP | 2001292424 A | 10/2001 |
| JP | 2010258908 A | 11/2010 |

OTHER PUBLICATIONS

Brant Candelore, Mahyar Nejat, Peter Shintani, Robert Noel Blanchard, "Scene-By-Scene Plot Context for Cognitively Impaired", file history of related U.S. Appl. No. 15/861,445, filed Jan. 3, 2018.

*Primary Examiner* — Oleg Asanbayev
(74) *Attorney, Agent, or Firm* — John L. Rogitz

(57) ABSTRACT

To improve cognitive comprehension of plots in videos and thus assist not only people with cognitive issues but also inattentive people that have trouble following along with the plot, information is sent about each scene in a video. By selecting "info" in a predetermined way, screen text is presented not about the entire show about rather about the current scene, such as a brief synopsis of what characters in the scene have done up to that point in the video.

17 Claims, 3 Drawing Sheets

"Info" toggled 3 times, e.g.

(56) References Cited

U.S. PATENT DOCUMENTS

| | | |
|---|---|---|
| 2009/0102848 A1 | 4/2009 | Park et al. |
| 2009/0119704 A1 | 5/2009 | Dimitrova et al. |
| 2013/0111525 A1* | 5/2013 | Choi ................ H04N 21/43615 725/42 |
| 2013/0343721 A1 | 12/2013 | Abecassis |
| 2014/0177964 A1 | 6/2014 | Godlewski et al. |
| 2015/0245101 A1* | 8/2015 | Stathacopoulos   H04N 21/47217 725/61 |

* cited by examiner

"Info" toggled twice, e.g.

"Info" toggled 3 times, e.g.

SCENE-BY-SCENE PLOT CONTEXT FOR COGNITIVELY IMPAIRED

FIELD OF THE INVENTION

The application relates generally to scene-by-scene plot contexts for the cognitively impaired.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is a content delivery network. As understood herein, there can be times when it is difficult to know what is happening in a video or what the dialogue concerns because the viewer has forgotten names or events that have happen earlier in the story. Simply pressing an "info" button on a remote control can provide a synopsis that summarizes the entire show, but it does not describe what is going on at any particular time. When someone cannot follow the plot, then often the person is lost for the entire duration.

Accordingly, a device includes at least one non-transitory computer readable storage medium with instructions executable by a processor to configure the processor for receiving content with plural scenes. The instructions when executed by the processor further configure the processor for, for a first scene in the plural scenes, receiving first plot information relating to the first scene, and likewise for a second scene in the plural scenes, receiving second plot information relating to the second scene. The first plot information is different from the second plot information. The instructions when executed by the processor configure the processor for presenting the first plot information with the first scene, and presenting the second plot information with the second scene.

In some implementations the device can include the processor and/or at least one display controllable by the processor to present the content.

In examples, the instructions when executed by the processor configure the processor for receiving first and second info commands from a control device during play of the first scene, and responsive to the first and second info commands, presenting the first plot information on a display. If desired, the instructions when executed by the processor may configure the processor for presenting the first plot information responsive to the first and second info commands only responsive to a determination that the second info command is received within a predetermined period of time following receipt of the first info command. Moreover, the instructions when executed by the processor can configure the processor for receiving first, second, and third info commands from a control device, and responsive to the first, second, and third info commands, presenting a list of selectable plot subjects selectable to cause the processor to present enhanced plot information related to the subject associated with a selected plot subject from the list.

In another aspect, a device includes at least one computer readable storage medium with instructions executable by a processor to configure the processor for receiving information about plural scenes in a video presentable by the processor on a display to improve cognitive comprehension of plots in videos and thus assist viewers of the video in following a plot of the video. The instructions when executed by the processor configure the processor for receiving at least one info command, and responsive to the info command, presenting on the display text about a currently playing scene, the text applying to action in the currently playing scene.

In another aspect, a method includes presenting on a display a first scene of a video having at least first and second scenes, and along with the first scene, presenting on the display alpha-numeric plot information related to the first scene but not the second scene.

The details of the present invention, both as to its structure and operation, can be best understood in reference to the accompanying drawings, in which like reference numerals refer to like parts, and in which:

DETAILED DESCRIPTION

Figure 1:
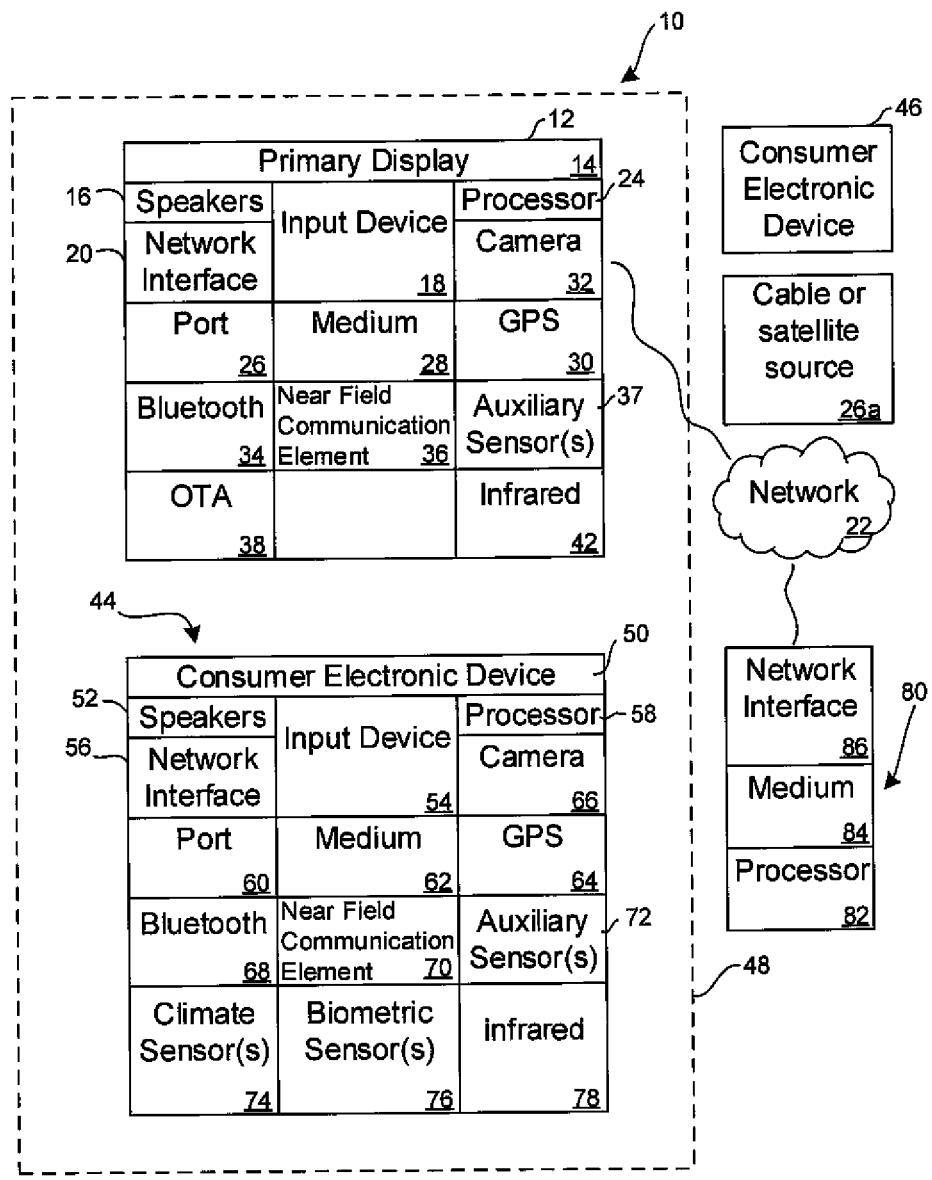
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
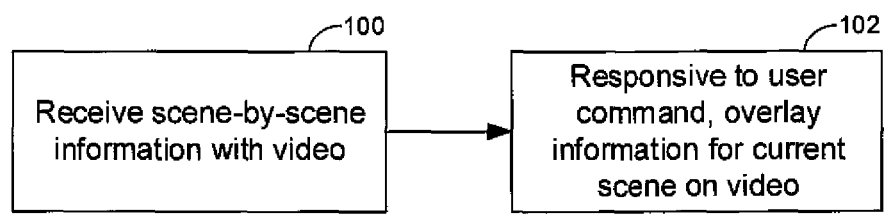
FIG. 2 is a flow chart of example logic according to present principles.

Now referring to FIG. 2, at block 100 a device such as the AVDD 12 receives receiving content with plural scenes. Along with one or more scenes of the content, data is delivered to the AVDD 12 which can be presented on the display 14 in alpha-numeric form at block 102, responsive to user command to do so if desired, that represents plot information relating to the scene. The plot information data can be delivered along with the content and can be keyed into the content stream to accompany the content which it describes, e.g., in the vertical blanking interval (VBI) of a broadcast stream, in packet headers of packetized video data, etc. In this way, for each different scene of content, if desired, plot information related to that respective scene can be presented on the display.

The user command to overlay the plot information onto the video may be a double toggle of an "info" key on the second CE device 46 implemented as a remote control (RC) of the AVDD 12, for example. A double toggle may be established by two manipulations of the info key within a predetermined period. A single toggle of the "info" button may cause to be presented an overall description of the entire program, whereas FIG. 3 shows that responsive to a double toggle command, an example screen shot 104 of the display 14 may be presented in which video 106 fills substantially the entire display screen and plot information 108 specific to the scene being shown, as opposed to the entire program, is presented.

The plot information 108 may thus summarize events that have occurred in the program thus far (i.e., up to the current scene) but will not "spoil" the program by mentioning events that occur in later scenes. Thus, the plot information 108 is not simply a generalized summary of the entire program but rather a specific clue pertaining to the scene being shown to help a viewer better follow what is unfolding in the program. Also unlike a generalized summary of the entire program, which remains static throughout the program, the plot information 108 changes from one scene to the next during the program.

Figure 3:
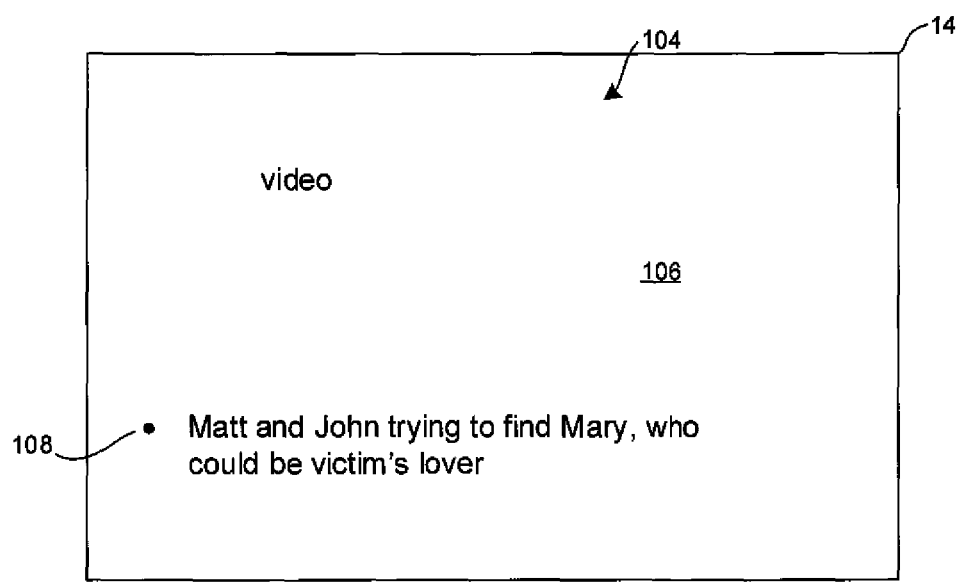
FIGS. 3 and 4 are screen shots of example user interfaces (UIs) according to present principles.
Figure 4:
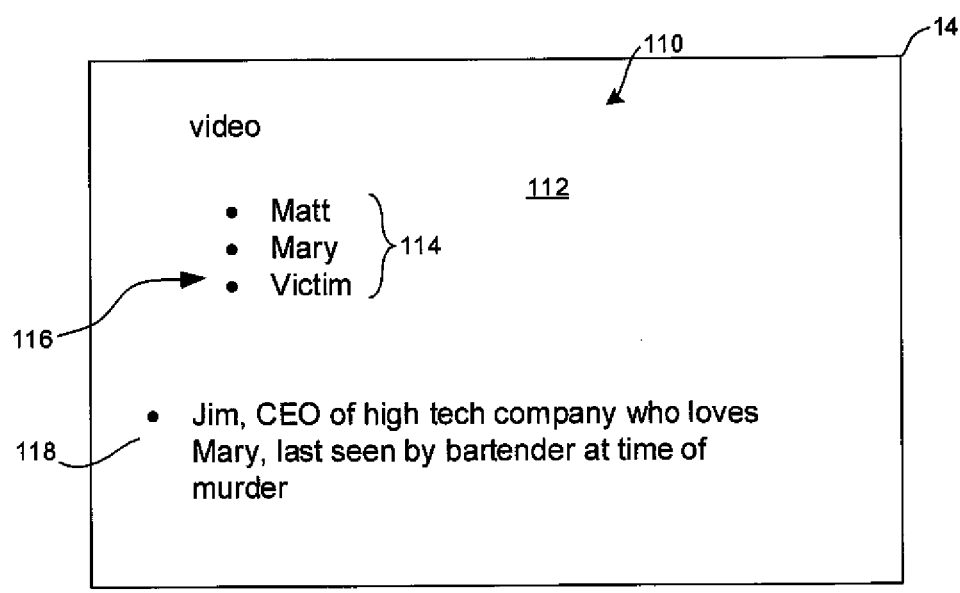

Additional, detailed scene information may also be provided in addition to the overall scene information shown in FIG. 3. FIG. 4 illustrates. Such additional detailed scene information may be presented in response to a user command generated by, e.g., three manipulations of the "info" key on the RC within a predetermined period.

As shown in FIG. 4, responsive to the more detailed information command however established, a screen shot 110 of the display 14 shows that the scene video 112 is presented substantially full screen with a list 114 of characters overlaid thereon. The characters in the list may be characters appearing in the current scene, so that other characters in the program are not shown in the current scene list 114. A viewer can manipulate the RC to move a selector 116 on the list and select a desired one of the characters, in response to which still further detailed information may be presented describing the selected character. Scene information 118 appears below the list 114.

Accordingly, present principles are related to accessibility and cognitive comprehension of plots and stories, recognizing that it can be helpful not only to people with cognitive issues but also "normal" people that have trouble following along with the plot. As with closed captioning data, scene information is sent about each scene. In the examples shown herein, detectives Matt and John are trying to find the whereabouts of Mary in order to question her about a murder. Mary was mentioned by the bartender when interviewed by Matt and John. The bartender said that Mary was present when the killing took place . . . and had been talking to the killer right before the shooting. In the scene represented in FIG. 3, Matt and John are knocking on the door of Mary's residence. But she does not appear to be home.

Then, in the scene represented in FIG. 4, the scene information indicates that the victim is Jim Stuart, CEO of a small high tech company who appeared to be having an affair with Mary.

In any case, scene information does not divulge future action in future scenes so as not to spoil the show, but instead allows viewers to re-engage or stay engaged with the show, program or movie.

In one example, the scene information may be delivered using so-called "608/708" descriptive data that is inserted into the stream of each scene. For IP streams, timed text tracks may be used to deliver timed data that can be displayed as needed by the viewer.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer memory that is not a transitory signal and that comprises instructions executable by at least one processor for:
receiving content with plural scenes, each of the plural scenes containing plot information, the plot information delivered by inserting descriptive data into a stream of each of the plural scenes;
receiving overall plot information pertaining to the content in its entirety;
for a current scene in the plural scenes, receiving first plot information containing a first specific clue pertaining to the current scene describing what is happening in the current scene;
for a second scene different from the current scene in the plural scenes, receiving second plot information containing a second specific clue pertaining to the second scene describing what is happening in the second scene, the first plot information being different from the second plot information;
responsive to receiving input of a first predetermined command during presentation of the current scene, presenting the overall plot information pertaining to the content in its entirety;
responsive to receiving input of a second predetermined command during presentation of the current scene, presenting the first plot information containing the first specific clue pertaining to the current scene describing what is happening in the current scene with the current scene;
responsive to receiving input of the second predetermined command during presentation of the second scene, presenting the second plot information containing the second specific clue pertaining to the second scene describing what is happening in the second scene with the second scene;
responsive to receiving input of a third predetermined command at any time during presentation of the content with the plural scenes, presenting a list of selectable plot subjects, selectable to cause the processor to present enhanced plot information related to the subject associated with a selected plot subject from the list; and
wherein the first predetermined command is established by a first number of clicks, the second predetermined command is established by a second number of clicks, and the third predetermined command is established by a third number of clicks.

2. The device of claim 1, comprising the at least one processor.

3. The device of claim 1, comprising at least one display controllable by the at least one processor to present the content.

4. The device of claim 1, wherein the first predetermined command is generated by a single click of an input device selector and the second predetermined command is generated by a double click of the input device selector.

5. The device of claim 4, wherein the instructions are executable for presenting the first plot information responsive to the determining that the second predetermined command has been received only responsive to a determination that a second click command is received within a predetermined period of time following receipt of a first click command.

6. The device of claim 4, wherein the instructions are executable for:
receiving a triple click command; and
responsive to the triple click command, presenting a list of selectable plot subjects selectable to cause the processor to present enhanced plot information related to the subject associated with a selected plot subject from the list.

7. A method, comprising:
receiving content with plural scenes, each of the plural scenes containing plot information, the plot information delivered by inserting descriptive data into a stream of each of the plural scenes;
receiving overall plot information pertaining to the content in its entirety;
for a current scene in the plural scenes, receiving first plot information containing a first specific clue pertaining to the current scene describing what is happening in the current scene;
for a second scene different from the current scene in the plural scenes, receiving second plot information containing a second specific clue pertaining to the second scene describing what is happening in the second scene, the first plot information being different from the second plot information;
responsive to receiving input of a first predetermined command during presentation of the current scene, presenting the overall plot information pertaining to the content in its entirety;
responsive to receiving input of a second predetermined command during presentation of the current scene, presenting the first plot information containing the first specific clue pertaining to the current scene describing what is happening in the current scene with the current scene;
responsive to receiving input of the second predetermined command during presentation of the second scene, presenting the second plot information containing the second specific clue pertaining to the second scene describing what is happening in the second scene with the second scene;
responsive to receiving input of a third predetermined command at any time during presentation of the content with the plural scenes, presenting a list of selectable plot subjects, selectable to cause the processor to present enhanced plot information related to the subject associated with a selected plot subject from the list, and
wherein the first predetermined command is established by a first number of clicks, the second predetermined command is established by a second number of clicks, and the third predetermined command is established by a third number of clicks.

8. The method of claim 7, wherein the method is executed by at least one processor.

9. The method of claim 7, wherein the first predetermined command is generated by a single click of an input device selector and the second predetermined command is generated by a double click of the input device selector.

10. The method of claim 9, comprising presenting the first plot information responsive to the determining that the second predetermined command has been received only responsive to a determination that a second click command is received within a predetermined period of time following receipt of a first click command.

11. The method of claim 9, comprising:

receiving a triple click command; and responsive to the triple click command, presenting a list of selectable plot subjects selectable to cause the processor to present enhanced plot information related to the subject associated with a selected plot subject from the list.

12. A device comprising:

at least one computer memory that is not a transitory signal and that comprises instructions executable by at least one processor to:

receive content with plural scenes, each of the plural scenes containing plot information, the plot information delivered by inserting descriptive data into a stream of each of the plural scenes;

receive overall plot information pertaining to the content in its entirety;

for a current scene in the plural scenes, receive first plot information containing a first specific clue pertaining to the current scene describing what is happening in the current scene;

for a second scene different from the current scene in the plural scenes, receive second plot information containing a second specific clue pertaining to the second scene describing what is happening in the second scene, the first plot information being different from the second plot information;

responsive to receiving input of a first predetermined command during presentation of the current scene, present the overall plot information pertaining to the content in its entirety;

responsive to receiving input of a second predetermined command during presentation of the current scene, present the first plot information containing the first specific clue pertaining to the current scene describing what is happening in the current scene with the current scene;

responsive to receiving input of the second predetermined command during presentation of the second scene, present the second plot information containing the second specific clue pertaining to the second scene describing what is happening in the second scene with the second scene;

responsive to receiving input of a third predetermined command during presentation of the content with the plural scenes, present selectable plot subjects selectable to cause the processor to present information related to the subject associated with a selected plot subject from the list; and wherein the first predetermined command is established by a first manipulation action, the second predetermined command is established by a second manipulation action different from the first manipulation action, and the third predetermined command is established by a third manipulation action.

13. The device of claim 12, comprising the at least one processor.

14. The device of claim 12, comprising at least one display controllable by the at least one processor to present the content.

15. The device of claim 12, wherein the first predetermined command is generated by a single click of an input device selector and the second predetermined command is generated by a double click of the input device selector.

16. The device of claim 15, wherein the instructions are executable to present the first plot information responsive to the determining that the second predetermined command has been received only responsive to a determination that a second click command is received within a predetermined period of time following receipt of a first click command.

17. The device of claim 15, wherein the instructions are executable to:

receive a triple click command; and responsive to the triple click command, present a list of selectable plot subjects selectable to cause the processor to present enhanced plot information related to the subject associated with a selected plot subject from the list.

* * * * *